(12) United States Patent
Morley et al.

(10) Patent No.: US 7,654,878 B2
(45) Date of Patent: Feb. 2, 2010

(54) LARGE FORMAT EMISSIVE DISPLAY

(76) Inventors: Roland M. Morley, 401 E. Del Rio Dr., Tempe, AZ (US) 85282; Robert F. Kwasnick, 2431 Ramona St., Palo Alto, CA (US) 94301; Robert C. Sundahl, 3322 E. Tonto Dr., Phoenix, AZ (US) 85044

( * ) Notice: Subject to any disclaimer, the term of this patent is extended or adjusted under 35 U.S.C. 154(b) by 639 days.

(21) Appl. No.: 11/325,961

(22) Filed: Jan. 5, 2006

(65) Prior Publication Data
US 2006/0116046 A1  Jun. 1, 2006

Related U.S. Application Data

(62) Division of application No. 09/847,447, filed on May 2, 2001, now abandoned.

(51) Int. Cl.
*H01J 9/00* (2006.01)
(52) U.S. Cl. ........................................................ 445/24

(58) Field of Classification Search ................. 361/681, 361/682; 313/422, 495; 445/23–25
See application file for complete search history.

(56) References Cited

U.S. PATENT DOCUMENTS

| | | | |
|---|---|---|---|
| 6,190,172 B1 * | 2/2001 | Lechner | 434/44 |
| 6,343,006 B1 * | 1/2002 | Moscovitch et al. | 361/681 |
| 6,370,019 B1 * | 4/2002 | Matthies et al. | 361/681 |
| 6,870,519 B2 * | 3/2005 | Sundahl | 345/1.3 |

* cited by examiner

*Primary Examiner*—Joseph L Williams
(74) *Attorney, Agent, or Firm*—Trop, Pruner & Hu, P.C.

(57) ABSTRACT

A backframe may be utilized to align a plurality of emissive display tiles precisely with respect to one another. The individual display tiles may be removable from the backframe for replacement or other reasons. As a result, the spacing between individual tiles in an overall large format display may be precisely controlled in some cases. In addition, regularly occurring gaps between adjacent tiles may be filled with a suitable light absorbing material to reduce the visibility of seams.

1 Claim, 2 Drawing Sheets

LARGE FORMAT EMISSIVE DISPLAY

This application is a divisional of U.S. patent application Ser. No. 09/847,447, filed on May 2, 2001 now abandoned.

BACKGROUND

This invention relates generally to large format emissive displays.

Large format displays may be utilized to create displays of a size greater than the size of conventional displays. For example, large format displays may combine the images produced from a plurality of conventional displays. The composite display may be able to produce an image which is much larger and more economical than that possible with existing display technologies.

Emissive displays include light emitting diodes, liquid crystal displays, and organic light emitting displays. These displays actually emit light at the pixel level which can perceived by viewers. Emissive displays may be combined together to create a large format display.

When emissive displays are combined to create a large format display, those displays may suffer from visible seams. The visible seams arise from the joints between the combined displays. The user looking at the large format display notices the individual displays which together are combined to create the overall image. Thus in some cases, the large format display may not produce a seamless image.

Another problem with large format displays is that the individual displays that are combined to form the large format display may be misaligned with respect to one another. Even the slightest misalignment may result in an irregularity in the overall image that may be noticeable to anyone viewing the large format display.

Thus, there is a need for better ways to combine emissive displays into large format displays.

DETAILED DESCRIPTION

Figure 1:
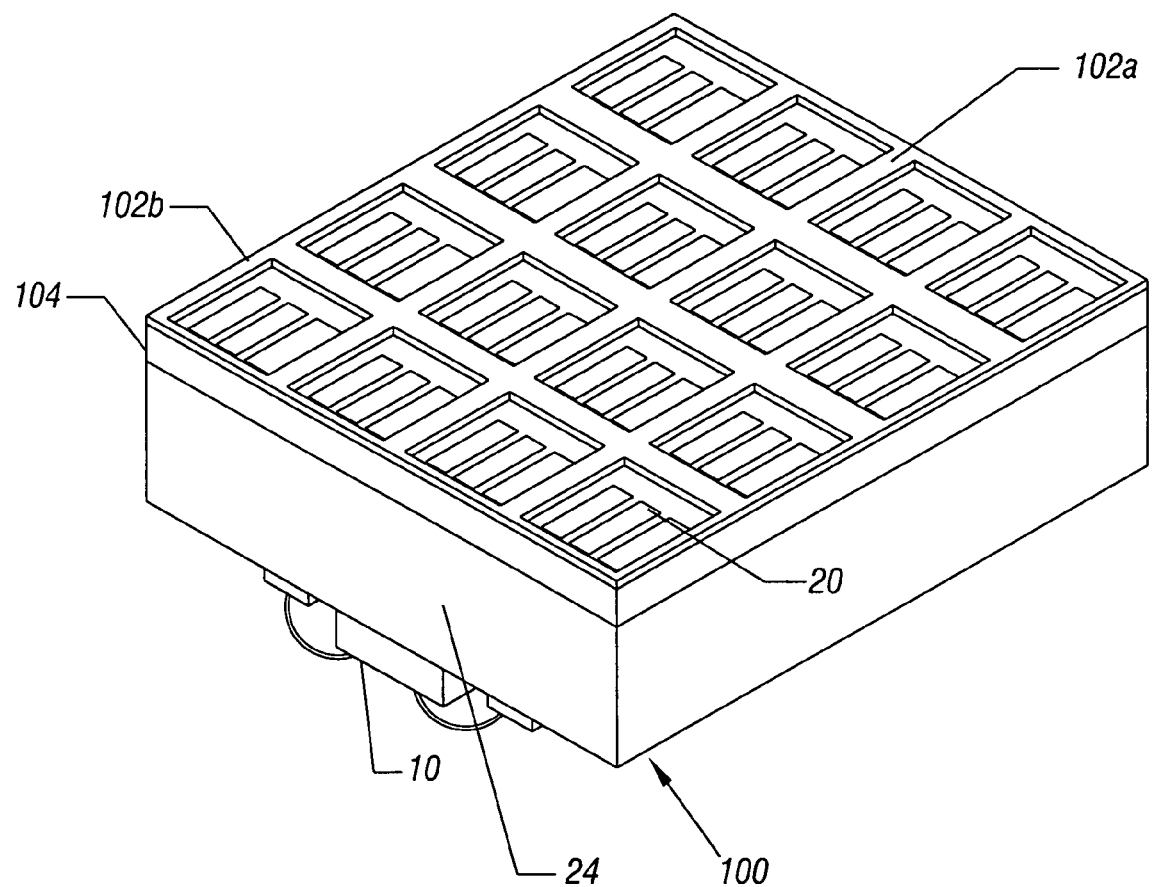
FIG. 1 is a perspective view of an emissive display tile in accordance with one embodiment of the present invention.

Referring to FIG. 1, an emissive display tile 100 may include a plurality of electroluminescent cells 20 each producing a pixel or subpixel of monochrome or color light. Thus, the cells 20 in a given display tile 100 may produce one or more pixels or subpixels of light which can contribute to the display of an image. In some cases, a large number of cells 20 may be utilized. In another case, fewer cells may be appropriate.

The display tile 100 may include an integrated circuit driver chip 10. The chip 10, mounted on the lower surface of the display tile 100, actually drives the display cells 20 by way of electrical connections in feedthroughs (not shown).

The tile 100 may include a body 24. In one embodiment, the body 24 may be a ceramic layer. Over the body 24 is a transparent layer 104 which may be formed of glass. A black material 102 is applied in a grid pattern on the top surface of the transparent layer 104.

The emissive cells 20 may actually be formed on the bottom surface of the transparent layer 104. The cells 20 are then visible from above, as shown in FIG. 1, because of the transparent nature of the transparent layer 104. In one embodiment, each cell 20 may include three light emitting elements such as a red, green and blue light emitting element.

The black material 102 includes an intermediate section 102a of greater width and a peripheral section 102b that may be less than one-half the width of the material 102a. Thus, when tiles 100 are butted one against the other and a slight gap is left between adjacent tiles, the combined sections 102b from two adjacent tiles 100 have a resulting width approximately equal to that of the section 102a. As a result, when the combined display is viewed, it has a consistent matrix pattern of pixels.

The black material 102 forms a matrix that covers the voids between individual cells 20. This may reduce reflection from electrode structures (not shown) on the bottom surface of the transparent layer 104 thereby increasing pixel contrast. The matrix 102 may be a grid of optically black absorbing material that covers the horizontal and vertical spaces between the cells 20 in the form of horizontal and vertical stripes. In one embodiment black material 102a may have a width that is a fraction, usually between 0.25 and 0.5 of the pixel-to-pixel spacing, to allow for misalignment between tiles when formed onto an array of tiles. Patterning may be achieved by transfer screen printing, ink jet printing or other methods capable of producing spatial positioning tolerances and feature sizes on the order of 10 microns.

The black matrix material 102 may be optically absorbing to visible wavelengths of light and resistant to removal during cleaning of the completed assembly with water or mild solvents. As one example, a black emulsion, as typically used in photomask fabrication may be used for this purpose.

Figure 2:
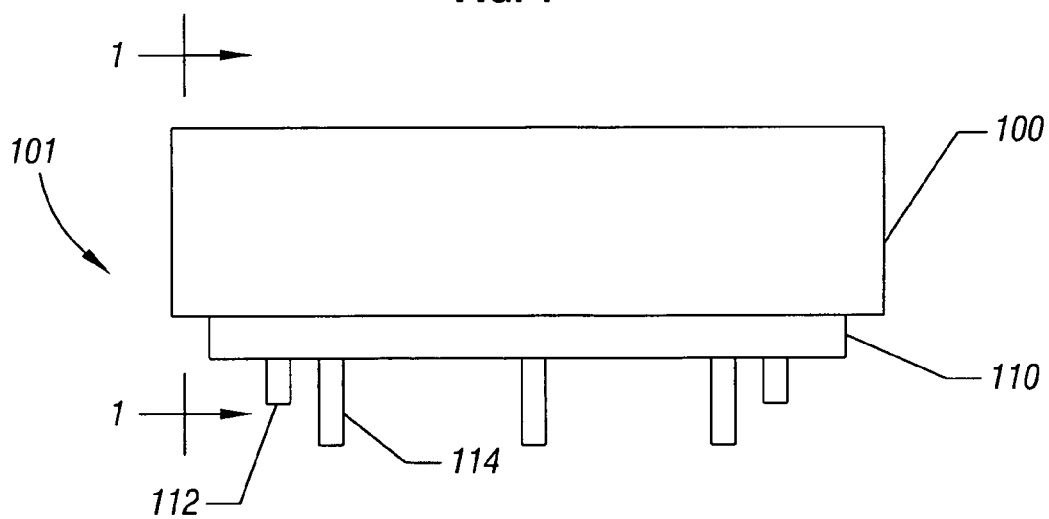
FIG. 2 is a side elevational view of an emissive display module in accordance with one embodiment of the present invention.

Referring to FIG. 2, the tile 100 may be mounted on a backplate 110. Each module 101, composed of a tile 100 with a backplate 110, may be optically, electrically and mechanically interchangeable with a plurality of other components in accordance with one embodiment of the present invention. The module assembly is performed at an optical alignment station that provides x, y and z dimensions to tolerances of about 10 microns in each direction. This means that the smallest pixel pitch for a seamless appearance is about one millimeter.

The backplate 110 may provide mechanical support to the display tile 100. The backplate 110 may assembled to the display tile 100 using a thin, flexible epoxy adhesive in one embodiment.

A pair of alignment elements 112 on the backplate 110 provide x and y alignment control at display assembly between the display tile 100 and the backplate 110. A variety of alignment elements 112 may be used including holes, grooves, tabs, and a variety of pin shapes as a few examples. An exemplary backplate 110 thickness may be one millimeter or more.

The backplate 110 may be smaller in size than the tile 100 by about one millimeter or more in one embodiment. Cut out regions (not shown) in the backplate 110 may provide clearance for tile electronics such as the chip 10 and connectors that are disposed on the back side of the tile 100. The backplate 110 may also include fastener extensions 114 for attachment to a backframe (not shown in FIG. 2).

Figure 3:
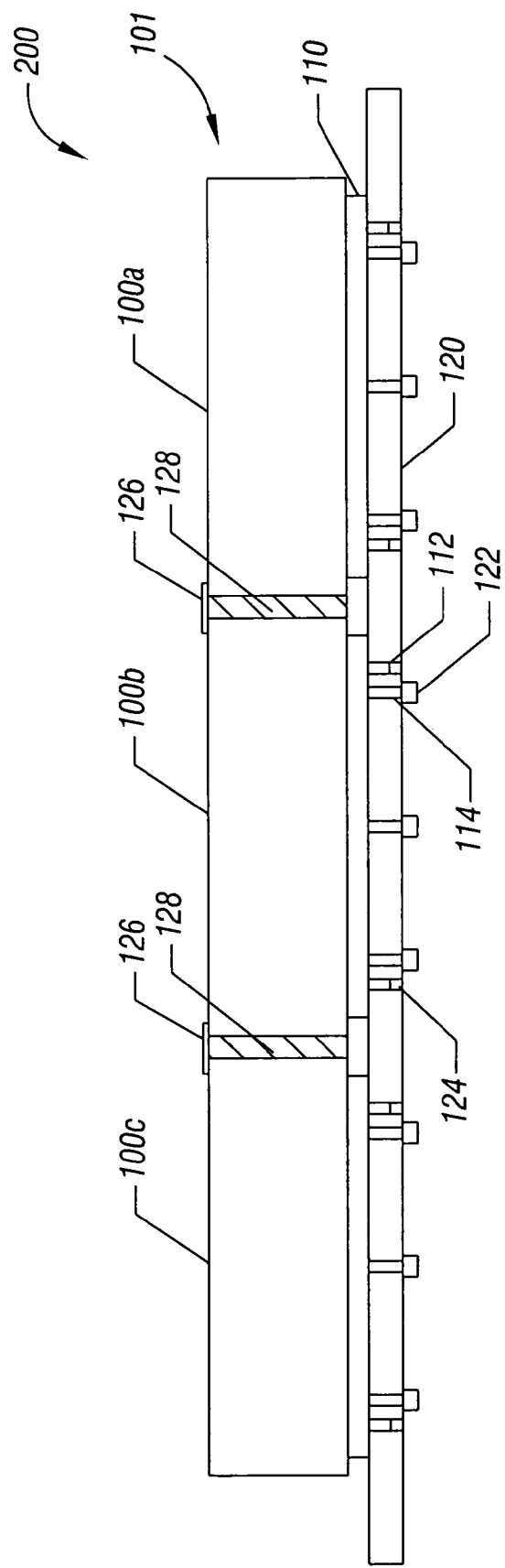
FIG. 3 is a front elevational view of a large format display in accordance with one embodiment of the present invention.

Referring to FIG. 3, the backframe 120 may include a number of alignment devices 124 to receive the alignment elements 112 and fasteners 114 of a plurality of modules 101. The alignment devices 124 may be pins, holes, grooves, or tabs, as a few examples. The alignment devices 124 mate with and align the alignment elements 112. As a result, a large number of modules 101 may be secured on the backframe 120 in precise relative alignment. The fasteners 114 may be secured onto the backframe 120 using nuts 122 as one example. However, any of a variety of other fasteners may be utilized as well, including rivets, releasable catches, friction welds, and solder, as additional examples.

The seams between adjacent modules 101 can then be filled by an optically clear, substantially index matching gap material 128. The gap material 128 may be an adhesive such as an acrylic or silicone adhesive. The gap material 128, for example, may be dispensed by syringe from the front side of the large format display 200. The gap material 128 may reduce the amount light scattered from the edges of each panel which would otherwise cause a seam to be visible, particularly when viewed off-axis.

To aid in the replacement of the individual display modules 101, a reworkable adhesive may be utilized as the gap material 128 in one embodiment. For example, an ultraviolet degradable epoxy may be used.

A black patterned coating 126 may be applied to the front of the large format display 200 in a form of horizontal and vertical stripes to cover the front of the seams, for example using a syringe. The width of the coating 126 may substantially match the width of the stripes of material 102*a* patterned on the individual tiles 100. The material used in the coating 126 may be identical to or similar in optical and mechanical properties to the material 102 used to pattern the stripes on the individual tiles 100.

The patterning results in a visual effect that presents a low contrast mesh pattern superimposed over the displayed image. This pattern may become part of the pixelated structure of the display, at a spatial frequency equal to that of the pixels. For normal viewing the distances between the fine structure of this pattern may not be resolvable in some embodiments. If one tile 100 must be replaced, its module 101 may be readily disconnected from the backframe 120.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

forming a display device having a plurality of spaced, light emitting cells;

coating the device with a matrix of light absorbing material;

forming said spaced light emitting cells on one side of a transparent layer;

coating a second side of said transparent layer with said absorbing material; and coating said transparent layer at locations overlying the regions between spaced, light emitting cells with first stripes of black material of a first width, coating the regions between the edge displays of the devices and the light emitting cells with a black second stripe of a smaller width, and joining display devices together so that said second stripes have a combined width approximately equal to the width of said first stripes.

* * * * *